United States Patent
Yamashita et al.

(10) Patent No.: US 7,859,324 B2
(45) Date of Patent: Dec. 28, 2010

(54) POWER SUPPLY UNIT

(75) Inventors: Osamu Yamashita, Tokyo (JP);
Yasuhiko Kokami, Tokyo (JP);
Masahiro Ishihara, Tokyo (JP);
Toshiyuki Tsunoda, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 64 days.

(21) Appl. No.: 12/342,710

(22) Filed: Dec. 23, 2008

(65) Prior Publication Data
US 2009/0212851 A1 Aug. 27, 2009

(30) Foreign Application Priority Data
Feb. 27, 2008 (JP) .............................. 2008-045388

(51) Int. Cl.
*G05F 1/10* (2006.01)
*G05F 3/02* (2006.01)

(52) U.S. Cl. .................. 327/540; 327/538; 323/316; 323/317

(58) Field of Classification Search ............... 327/530, 327/538–543, 546; 323/312–317
See application file for complete search history.

(56) References Cited

U.S. PATENT DOCUMENTS

| | | | | |
|---|---|---|---|---|
| 4,906,874 A | * | 3/1990 | Fuji et al. ................... | 327/552 |
| 5,694,063 A | * | 12/1997 | Burlison et al. ............... | 327/50 |
| 2004/0212420 A1 | * | 10/2004 | Otake ........................ | 327/536 |
| 2005/0017702 A1 | * | 1/2005 | Kernahan et al. ........... | 323/282 |
| 2008/0259655 A1 | * | 10/2008 | Wei et al. ................. | 363/21.18 |

* cited by examiner

*Primary Examiner*—Lincoln Donovan
*Assistant Examiner*—Brandon S Cole
(74) *Attorney, Agent, or Firm*—Mattingly & Malur, P.C.

(57) ABSTRACT

High-accuracy overcurrent detection is performed, while a loss resulting from the current detection is significantly reduced. A switch section outputs the voltage between the both terminals of a current detection resistor using an AND signal between an output signal from a hysteresis comparator and an output signal from a pre-driver. The voltage is filtered by an electrostatic capacitor element and a resistor, and inputted to a comparator. The comparator makes a comparison between the signals inputted to the two input terminals thereof, and outputs the result of the comparison to a digital filter. When an overcurrent begins to flow in a power supply unit, the levels of the voltages inputted to the two input terminals of the comparator are inverted so that the comparator outputs an inversion signal to the digital filter. The digital filter outputs a detection signal to an overcurrent detection circuit when an arbitrary time has elapsed.

4 Claims, 5 Drawing Sheets

POWER SUPPLY UNIT

CROSS-REFERENCE TO RELATED APPLICATIONS

The disclosure of Japanese Patent Application No. 2008-45388 filed on Feb. 27, 2008 including the specification, drawings and abstract is incorporated herein by reference in its entirety.

BACKGROUND OF THE INVENTION

The present invention relates to a technology for improving the efficiency of a power supply unit and, more particularly, to a technology which is effective in reducing the occurrence of a loss due to overcurrent detection in a DC-DC converter.

Examples of an electronic device such as a hard disc drive include one using a DC-DC converter of a PWM (Pulse Width Modulation) type as a stabilized DC power supply or the like.

There is a DC-DC converter of this type which has an overcurrent detecting function for preventing the breakdown of an inductor, the output element of the DC-DC converter, or the like even when a load current enters an abnormal state.

As causes of the abnormal state of the load current, various factors can be considered such as the breakdown of a semiconductor integrated circuit device or a power MOSFET serving as a load, and an overflow of a smoothing capacitor. As the patterns of the abnormal load current also, various states can be assumed such as a load short-circuited state, and an over-load state which is reached with time.

Therefore, unless it can be accurately determined whether the detected load current is a current to be supplied to the semiconductor integrated circuit device in a normal state or a current flowing when any abnormality has occurred, the semiconductor integrated circuit device or the power MOSFET serving as the load may require a breakdown voltage with excess margin for the current ability of the DC-DC converter or, conversely, the element may break down without succeeding in detecting an overcurrent. As a result, a high-accuracy method for detecting an average load current becomes necessary.

As examples of a technology for detecting the average load current, there are known one which detects an average load current, one which detects a power supply current, and the like.

First, according to the technology for detecting the average load current, the average load current is determined by inserting a detection resistor in series between a smoothing inductor and a smoothing capacitor, approximating the voltage between both terminals of the detection resistor to a load current through attenuation of ripple in a fPWM (variable pulse width modulation) cycle therein using a low-pass filter, and making a comparison using a comparator.

Subsequently, the result of the determination by the comparator is outputted to a subsequent-stage digital filter which counts a detection time and, when a set time is reached, a regulator is shut down using a subsequent-stage OC (Over Current) circuit.

On the other hand, in the case of detecting the power supply current, the average load current is equivalently determined by inserting a detection resistor between a power supply and the source of a power MOSFET, attenuating ripple in the fPWM cycle in the voltage between both terminals of the detection resistor using a low-pass filter, and making a comparison using a comparator.

Because a power supply current flows only during the ON time interval of a switching cycle, it has the shape of a rectangular wave, and is approximated to the load current by performing filtering using the low-pass filter mentioned above.

SUMMARY OF THE INVENTION

However, it has been found by the present inventors that a technology for detecting an abnormal current in a DC-DC converter as described above has the following problems.

In the case of detecting the average load current, there is the problem that, since the detection resistor is inserted in series to the smoothing inductor, a loss equivalent to a product of a load current and a detection resistance constantly occurs to prevent an increase in the efficiency of the DC-DC converter.

In the case of detecting the power supply current, there is the problem that the accuracy is lower than in the case of directly detecting the load current. To average the power supply current, a relatively large low-pass filter is further required to prevent a reduction in the size of the DC-DC converter.

An object of the present invention is to provide a technology which allows high-accuracy overcurrent detection, while significantly reducing a loss resulting from the current detection.

The above and other objects and novel features of the present invention will become apparent from the description of the present specification and the accompanying drawings.

As shown below, a brief description will be given to the outline of representative aspects of the invention disclosed in the present application.

According to an aspect of the present invention, a power supply unit includes: a stabilized power supply section for generating a stabilized power supply; and a current detection section for detecting an average load current in the stabilized power supply generated by the stabilized power supply section, wherein the current detection section includes: a current detection resistor for performing current detection; a control section for outputting a control signal in each cycle of an arbitrary period; a sample/hold section for holding a voltage between both terminals of the current detection resistor at arbitrary time intervals based on the control signal from the control section; and a filter section for attenuating ripple in a PWM cycle which is included in a signal sampled by the sample/hold section.

According to another aspect of the present invention, the stabilized power supply section has first and second switching elements each for performing voltage conversion, wherein the current detection resistor has one coupling portion coupled to an input power supply voltage, and wherein the first and second switching elements are coupled in series between the other coupling portion of the current detection resistor and a reference potential.

According to still another aspect of the present invention, the control section generates the control signal so as to cause the sample/hold section to sample the voltage between both terminals of the current detection section during a time interval in which the first switching element is ON.

An outline of other inventive aspects of the present application will be briefly shown.

According to another aspect of the present invention, a power supply unit includes: a stabilized power supply section for generating a stabilized power supply; and a current detection section for detecting an average load current in the stabilized power supply generated by the stabilized power supply section, wherein the stabilized power supply section includes: first and second switching elements coupled in series between an input power supply voltage and a reference potential to perform voltage conversion, and wherein the current detection section includes: a control section for outputting a control signal in each cycle of an arbitrary period; a sample/hold section for holding a voltage between both terminals generated between both coupling portions of the first switching element at arbitrary time intervals based on the control signal from the control section; and a filter section for attenuating ripple in a PWM cycle which is included in a signal sampled by the sample/hold section.

According to still another aspect of the present invention, the control section generates the control signal so as to cause the sample/hold section to sample a voltage between both terminals of the current detection section during a time interval in which the first switching element is ON.

According to yet another aspect of the present invention, the stabilized power supply section is a DC-DC converter.

The following is a brief description of effects achievable by the representative aspects of the invention disclosed in the present application.

(1) High-accuracy current detection can be implemented, while a loss resulting from the current detection is reduced.

(2) Due to the effect (1) shown above, the efficiency of a power supply unit can be improved, and the performance thereof can be improved.

DETAILED DESCRIPTION OF THE PREFERRED EMBODIMENTS

Figure 1:
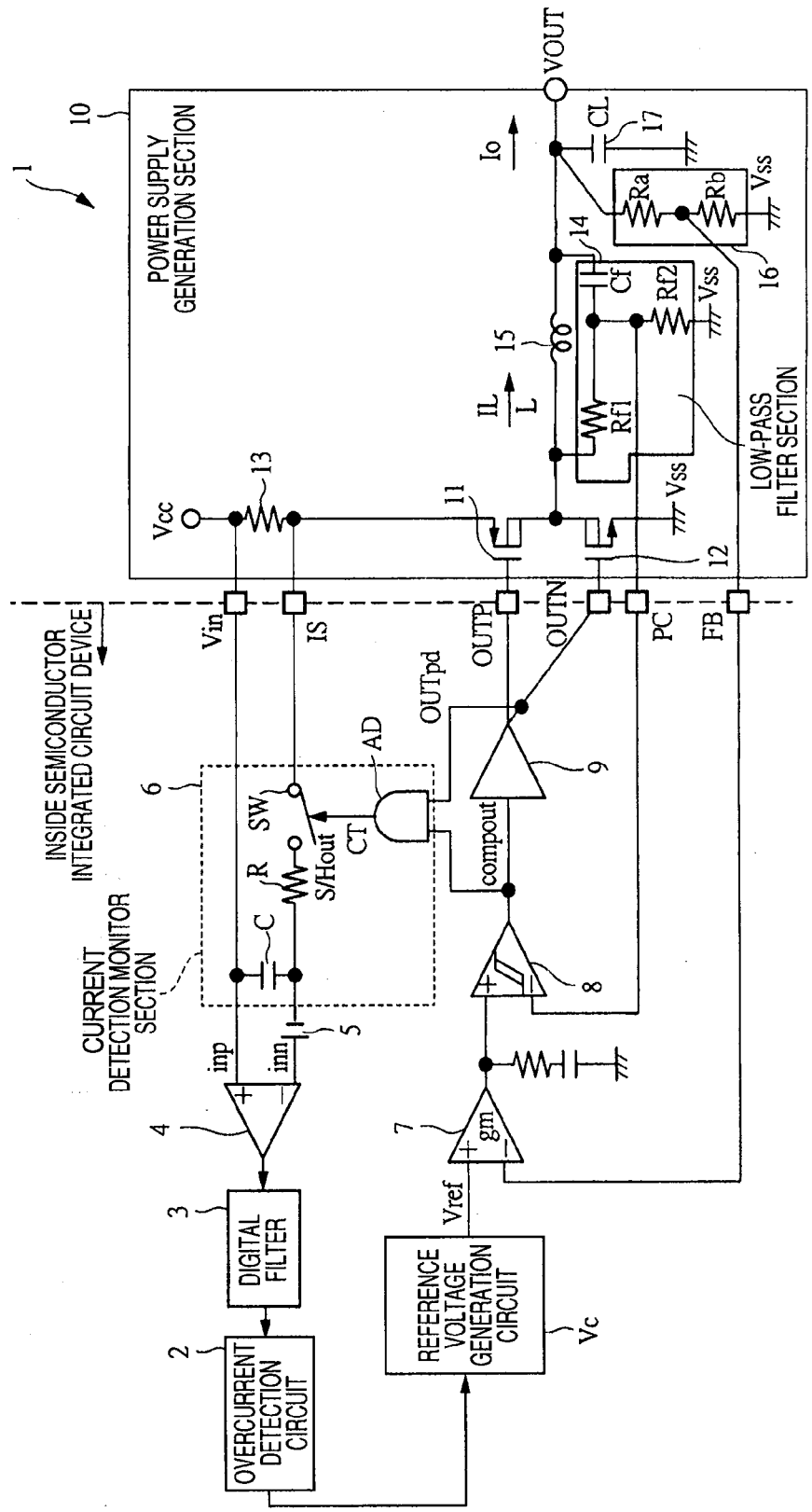
FIG. 1 is an illustrative view showing an example of a structure of a power supply unit according to a first embodiment of the present invention.

Referring to the drawings, embodiments of the present invention will be described hereinbelow in detail. Throughout the drawings for illustrating the embodiments, the same members are designated by the same reference numerals, and a repeated description thereof will be omitted.

Embodiment 1

Figure 2:
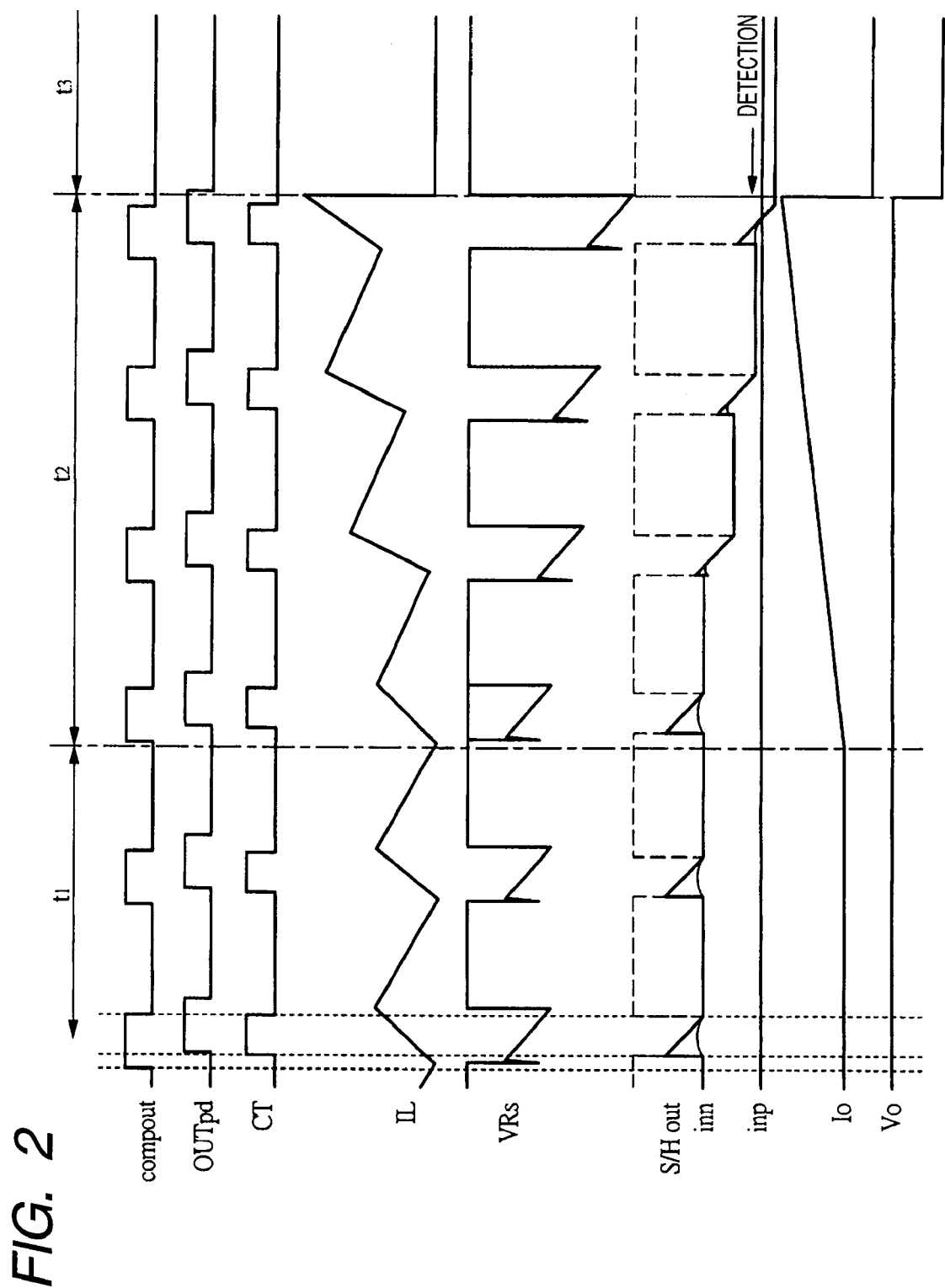
FIG. 2 is a timing chart of signals in the individual sections of the power supply unit of FIG. 1.

FIG. 1 is an illustrative view showing an example of a structure of a DC-DC converter according to the first embodiment of the present invention. FIG. 2 is a timing chart for signals in the individual sections of the DC-DC converter of FIG. 1.

In the present first embodiment, a power supply unit 1 includes, e.g., a DC-DC converter of a peak-current-mode control type, and provides a stable power supply to a semiconductor integrated circuit device or the like.

As shown in FIG. 1, the power supply unit 1 includes an overcurrent detection circuit 2, a digital filter 3, a comparator 4, an offset power supply circuit 5, a current detection monitor section 6, an error amplifier 7, a hysteresis comparator 8, a pre-driver 9, and a power supply generation section 10.

The current detection monitor section 6 includes an electrostatic capacitor element C, a resistor R, a switch section SW, and an AND circuit AD. The electrostatic capacitance element C and the resistor R, each forming a current detection section, configure a low-pass filter serving as a filter section, and the switch section SW also forming the current detection section configures a sample/hold section. On the other hand, the AND circuit AD serving as a control section generates a control signal for controlling the ON/OFF operation of the switch section SW.

The overcurrent detection circuit 2, the digital filter 3, the comparator 4, the offset power supply circuit 5, the current detection monitor section 6, the error amplifier 7, the hysteresis comparator 8, and the pre-driver 9 are, e.g., circuits provided inside the semiconductor integrated circuit device, while the power supply generation section 10 is a circuit provided outside the semiconductor integrated circuit device.

The power supply generation section 10 includes transistors 11 and 12, a current detection resistor 13, a low-pass filter section 14, a smoothing coil 15, a feedback circuit 16, and a smoothing capacitor 17. The error amplifier 7, the hysteresis comparator 8, the pre-driver 9, and the power supply generation section 10 configure a stabilized power supply section which is the DC-DC converter.

The transistor 11 as a first switching element includes a P-channel MOS (Metal Oxide Semiconductor)-FET (Field Effect Transistor). The transistor 12 as a second switching element includes an N-channel MOS-FET.

Each of the current detection monitor section 6, one coupling portion of the electrostatic capacitor element C, and the positive (+) input terminal of the comparator 4 is coupled to receive a power supply voltage VCC as an input power supply voltage via an external terminal Vin of the semiconductor integrated circuit device.

To an external terminal IS of the semiconductor integrated circuit device, one coupling portion of the switch section SW is coupled. To the other coupling portion of the switch section SW, one coupling portion of the resistor R is coupled.

To the other coupling portion of the resistor R, each of the other coupling portion of the electrostatic capacitor element C, and the input portion of the offset power supply circuit 5 is coupled. To the output portion of the offset power supply circuit 5, the negative (−) input terminal of the comparator 4 is coupled. The offset power supply circuit 5 generates an arbitrary offset voltage, and applies the generated offset voltage to the negative (−) input terminal of the comparator 4.

To the output portion of the comparator 4, the input portion of the digital filter 3 is coupled. To the output portion of the digital filter 3, the overcurrent detection circuit 2 is coupled.

To the negative (−) input terminal of the error amplifier 7, an external terminal FB of the semiconductor integrated circuit device is coupled. The positive (+) input terminal of the error amplifier 7 is coupled to receive a reference voltage Vref generated by a reference voltage generation circuit VC provided in the semiconductor integrated circuit device.

To the output portion of the error amplifier 7, the positive (+) input terminal of the hysteresis comparator 8 is coupled. To the negative (−) input terminal of the hysteresis comparator 8, an external terminal PC of the semiconductor integrated circuit device is coupled.

To the output portion of the hysteresis comparator 8, each of the input portion of the pre-driver 9, and one input portion of the AND circuit AD is coupled. To the output portion of the pre-driver 9, each of external terminals OUTP and OUTN of the semiconductor integrated circuit device, and the other input portion of the AND circuit AD is coupled. The AND circuit AD performs an AND operation between an output signal from the hysteresis comparator 8 and an output signal from the pre-driver 9, and outputs the AND therebetween as the control signal to the control terminal of the switch section SW.

To the external terminal Vin of the semiconductor integrated circuit device, one coupling portion of the current detection resistor 13 is coupled. To the external terminal IS of the semiconductor integrated circuit device, the other coupling portion of the current detection resistor 13 is coupled.

To the external terminal IS, one coupling portion of the transistor 11 is also coupled. To the other coupling portion of the transistor 11, one coupling portion of the transistor 12 is coupled. To the other coupling portion of the transistor 12, a reference potential VSS is coupled.

To the gate of the transistor 11, the external terminal OUTP is coupled. To the gate of the transistor 12, the external terminal OUTN is coupled. To the coupling portion between the transistors 11 and 12, each of one coupling portion of the smoothing coil 15 and the low-pass filter section 14 is coupled.

The low-pass filter section 14 includes resistors Rf1 and Rf2, and an electrostatic capacitor element Cf, and outputs a voltage analogous to a current flowing in the smoothing coil 15.

To one coupling portion of the resistor Rf1, one coupling portion of the smoothing coil 15 is coupled. To the other coupling portion of the resistor Rf1, each of one coupling portion of the electrostatic capacitor element Cf and one coupling portion of the resistor Rf2 is coupled.

To the other coupling portion of the electrostatic capacitor element Cf, the other coupling portion of the smoothing coil 15 is coupled. To one coupling portion of the resistor Rf2, the external terminal PC is coupled. To the other coupling portion of the resistor Rf2, the reference potential VSS is coupled.

To the other coupling portion of the smoothing coil 15, each of the feedback circuit 16 including resistors Ra and Rb and one coupling portion of the smoothing capacitor 17 is coupled. The other coupling portion of the smoothing coil 15 serves as an output portion VOUT of the power supply unit 1.

To one coupling portion of the resistor Ra, the other coupling portion of the smoothing coil 15 is coupled. To the other coupling portion of the resistor Ra, one coupling portion of the resistor Rb is coupled. To the other coupling portion of the resistor Rb, the reference potential VSS is coupled. To the coupling portion between the resistors Ra and Rb, the external terminal PC is coupled. The feedback circuit 16 divides an output voltage of the power supply unit 1 with the resistors Ra and Rb, and outputs a voltage resulting from the voltage division as a detection voltage.

The error amplifier 7 makes a comparison between the reference voltage Vref and the feedback voltage outputted from the feedback circuit 16, amplifies the error therebetween, and outputs the amplified error. The hysteresis comparator 18 makes a comparison between an output signal from the error amplifier 7 and an output signal from the low-pass filter section 14, and outputs the result of the comparison to the pre-driver 9.

The pre-driver 9 outputs respective control signals for driving the transistors 11 and 12 to the respective gates of the transistors 11 and 12 based on the output signal from the hysteresis comparator 8. The transistors 11 and 12 perform ON/OFF operations based on the control signals from the pre-driver 9, and output arbitrary voltages.

Next, a description will be given of an overcurrent detecting operation in the power supply unit 1 according to the present embodiment.

FIG. 2 is a timing chart for signals in the individual sections of the power supply unit 1.

In a downward direction of FIG. 2, there are shown respective signal timings for an output signal compout from the hysteresis comparator 8, an output signal OUTpd from the pre-driver 9, an output signal CT from the AND circuit AD, a current IL flowing in the smoothing coil 15, a voltage VRs between the both terminals of the current detection resistor 13, a sample/hold signal S/Hout outputted from the switch section SW, a signal inn inputted to the positive (+) input terminal of the comparator 4, a signal inp inputted to the negative (−) input terminal of the comparator 4, a current Io outputted from the output portion VOUT, and a voltage Vo outputted from the output portion VOUT.

First, a description will be given of the operation in the time interval t1 of FIG. 2 in which a normal operation is performed.

First, in the time interval t1, the AND circuit AD outputs the output signal CT which is the AND between the output signal compout from the hysteresis comparator 8 and the output signal OUTpd from the pre-driver 9 to the switch section SW.

The switch section SW serving as the sample/hold section is brought into a conductive (ON) state when the output signal CT on a Hi level is inputted to the control terminal to output a signal (a power supply current equivalent to an inductor current) at the same voltage as the voltage VRs between the both terminals of the current detection resistor 13 as the sample/hold signal S/Hout.

In this case, by turning ON the switch section SW with the AND signal between the output signal compout and the output signal OUTpd, it is possible to prevent the switch section SW from outputting noise occurring during the operation of the transistors 11 and 12 and the like. That is, the AND circuit AD does not sample-hold noise by outputting, as the control signal CT, a desired period included in the period during which the transistors 11 and 12 are ON/OFF controlled. This allows accurate detection of only a current equivalent to the inductor current.

The sample/hold signal S/Hout outputted from the switch section SW is filtered by the low-pass filter including the electrostatic capacitor element C and the resistor R to receive the offset voltage applied thereto by the offset power supply circuit 5, and inputted as the signal inn to the comparator 4.

Thus, by performing filtering with respect to the sample/hold signal S/Hout using the low-pass filter, it is possible to attenuate the ripple component of the inductor current in a fPWM cycle, and increase determination accuracy.

When the output signal CT shifts to a Lo level, the switch section SW is brought into a non-conductive (OFF) state to approximately reproduce the inductor current from the power supply current by holding a final value immediately before the switch section SW is turned OFF.

The comparator 4 makes a comparison between the signal inn and the signal inp, and outputs the result of the comparison to the digital filter 3. In a normally operating state, the signal inn to which the offset voltage has been applied is on a voltage level higher than that of the signal inp.

Thereafter, in the interval t2 of FIG. 2, when an overcurrent begins to flow in the power supply unit 1 for any reason, the current Io outputted from the output portion VOUT increases, and the voltage level of the voltage VRs between the both terminal portions of the current detection resistor 13 also increases with the increase of the current Io.

When the voltage level of the voltage VRs increases, the voltage level of the sample/hold signal S/Hout outputted from the switch section SW lowers so that the respective voltage levels of the signal inp and the signal inn are finally inverted.

As a result, the comparator 4 outputs an inversion signal indicating that the voltage level of the signal inp is higher than that of the signal inn to the digital filter 3. The digital filter 3 outputs a detection signal to the overcurrent detection circuit 2 when there is no change in the output signal from the comparator 4 even after an arbitrary time has elapsed.

Subsequently, in the time interval t3 of FIG. 2, the overcurrent detection circuit 2 determines that the overcurrent is flowing in the power supply unit 1 on receiving the detection signal from the digital filter 3, and outputs a control signal to the reference voltage generation circuit VC.

On receiving the control signal, the reference voltage generation circuit VC stops the supply of the reference voltage Vref outputted to the error amplifier 7 so that the operation of the power supply unit 1 is stopped.

According to the present embodiment, by providing the current detection resistor 13 between the power supply voltage VCC and one coupling portion (source terminal) of the transistor 11, the loss resulting from the current detection resistor 13 is limited only to the time interval in which the transistor 11 is ON. Therefore, the loss resulting from the current detection can be reduced.

By additionally providing the current detection monitor section 6 including the sample/hold section and the low-pass filter, it is possible to detect the overcurrent with high accuracy.

Embodiment 2

Figure 3:
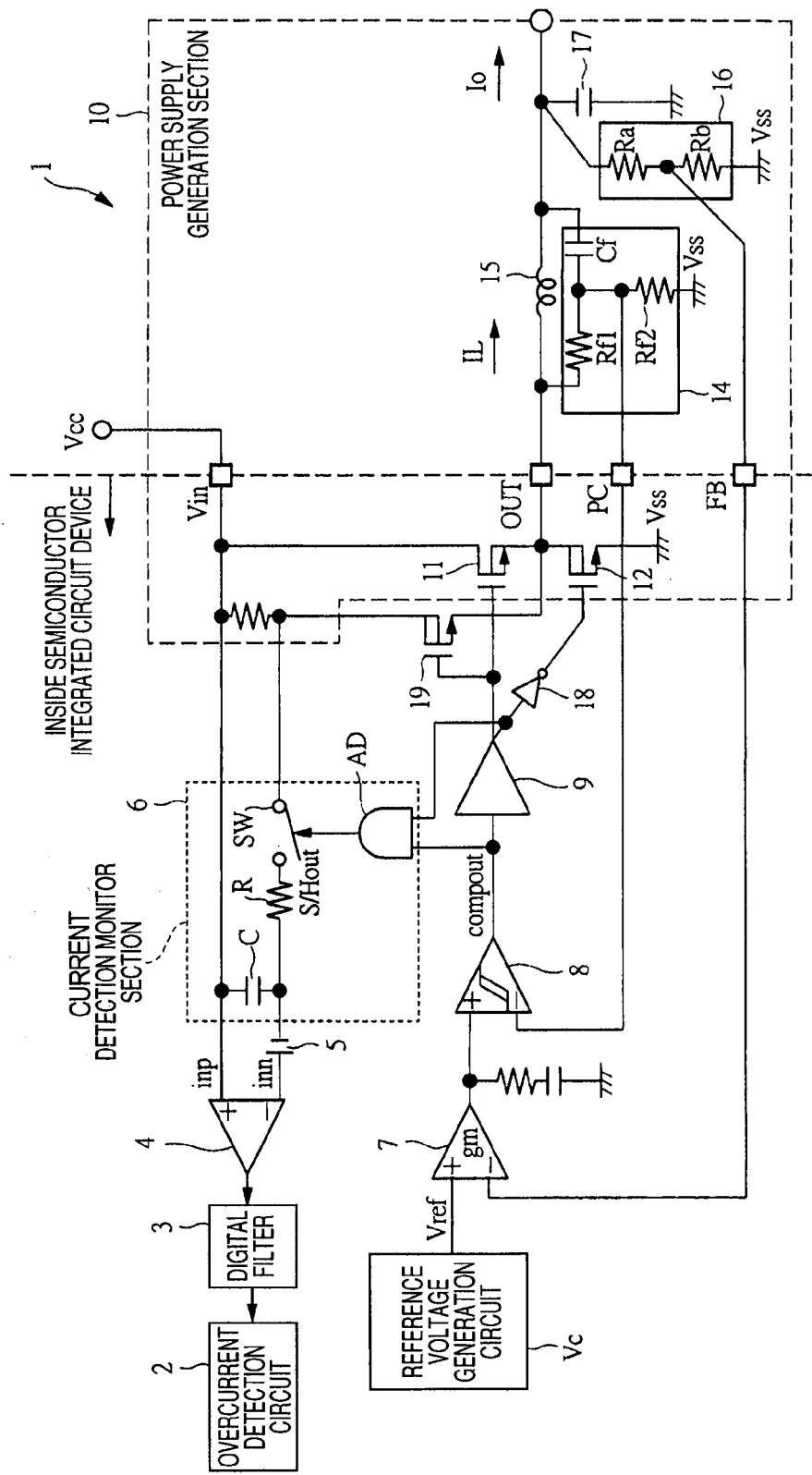
FIG. 3 is an illustrative view showing an example of a structure of the power supply unit according to a second embodiment of the present invention.

FIG. 3 is an illustrative view showing an example of a structure of the power supply unit according to the second embodiment of the present invention.

In the present second embodiment, the power supply unit 1 has a structure obtained by newly adding an inverter 18 and a transistor 19 for sensing including an N-channel MOS to the same structure as provided in the foregoing first embodiment, which includes the overcurrent detection circuit 2, the digital filter 3, the comparator 4, the offset power supply circuit 5, the current detection monitor section 6, the error amplifier 7, the hysteresis comparator 8, the pre-driver 9, and the power supply generation section 10, as shown in FIG. 3.

The current detection monitor section 6 also has the same structure as in the first embodiment described above, and includes the electrostatic capacitor element C, the resistor R, the switch section SW, and the AND circuit AD. Likewise, the power supply generation section 10 also includes the transistors 11 and 12, the current detection resistor 13, the low-pass filter section 14, the smoothing coil 15, the feedback circuit 16, and the smoothing capacitor 17.

In the present second embodiment, the overcurrent detection circuit 2, the digital filter 3, the comparator 4, the offset power supply circuit 5, the current detection monitor section 6, the error amplifier 7, the hysteresis comparator 8, the pre-driver 9, the inverter 18, the transistor 19, and the transistors 11 and 12 and current detection resistor 13 of the power supply generation section 10 are, e.g., circuits provided inside the semiconductor integrated circuit device, while the low-pass filter section 14, the smoothing coil 15, the feedback circuit 16, and the smoothing capacitor 17 as the other components of the power supply generation section 10 are circuits provided outside the semiconductor integrated circuit device.

To the external terminal Vin of the semiconductor integrated circuit device, one coupling portion of the current detection resistor 13 is coupled. To the other coupling portion of the current detection resistor 13, one coupling portion of the transistor 19 is coupled.

To the other coupling portion of the transistor 19, the coupling portion between the transistors 11 and 12 is coupled. To the coupling portion, the external terminal OUT of the semiconductor integrated circuit device is coupled. To the external terminal OUT, one coupling portion of the smoothing coil 15 is coupled.

To the input portion of the inverter 18, the output portion of the pre-driver 9 is coupled. To the output portion of the inverter 18, the gate of the transistor 12 is coupled. To the output portion of the pre-driver 9, each of the other input portion of the AND circuit AD, the gate of the transistor 19, and the gate of the transistor 11 is coupled.

In contrast to the transistor 11 which is the P-channel MOSFET in the first embodiment described above, the transistor 11 is an N-channel MOSFET in the second embodiment. As for the other part of the coupling configuration, it is the same as in FIG. 1 showing the first embodiment described above so that the description thereof will be omitted.

In this case, the transistor 19 is turned ON/OFF in synchronization with the transistor 11 so that a current for detection flows in the current detection resistor 13 only during the time interval in which the transistor 19 is ON.

As a result, it is also possible in the present second embodiment to detect the overcurrent with high accuracy, while reducing a loss resulting from the current detection resistor 13.

Embodiment 3

Figure 4:
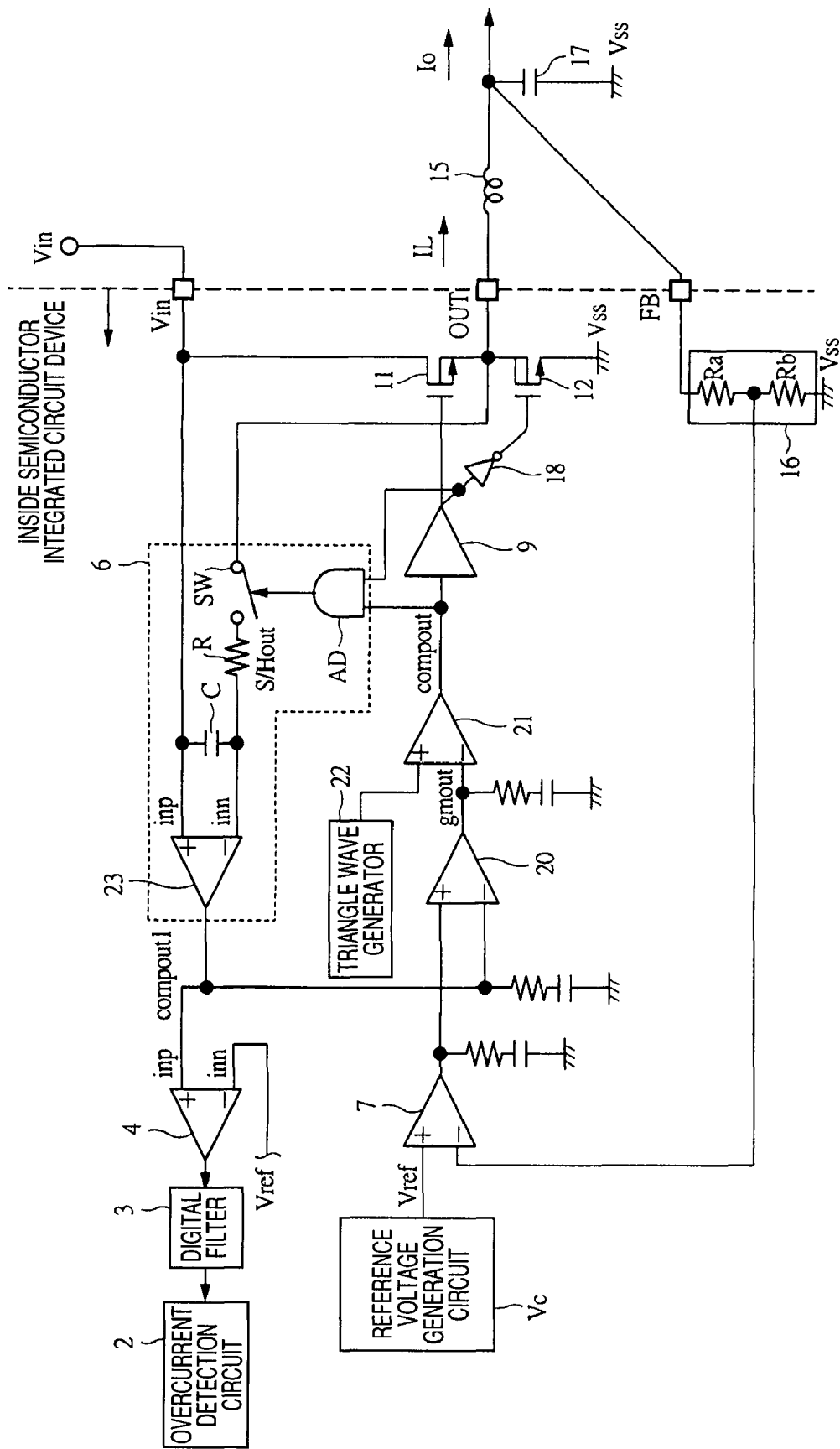
FIG. 4 is an illustrative view showing an example of a structure of the power supply unit according to a third embodiment of the present invention.
Figure 5:
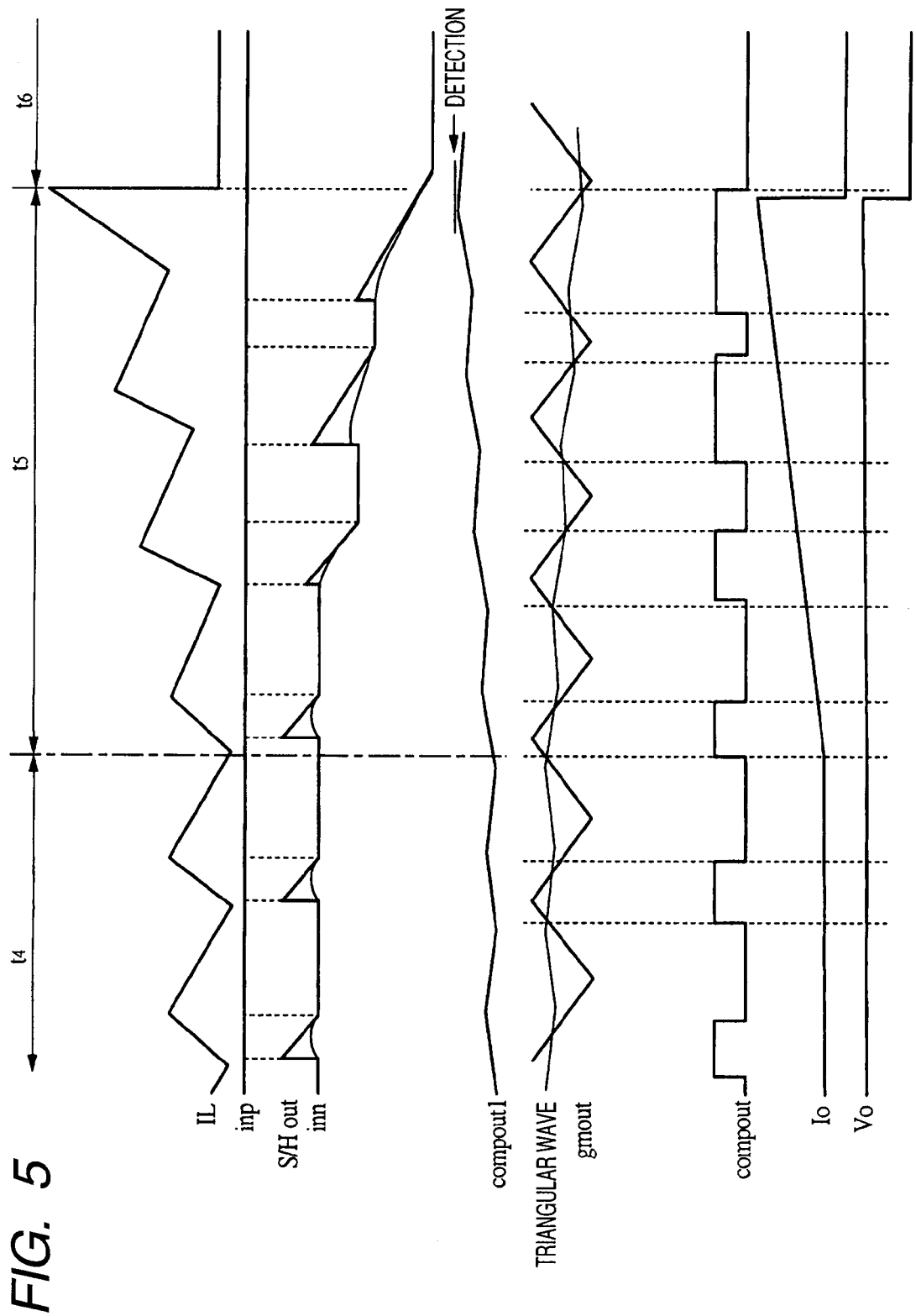
FIG. 5 is a timing chart of signals in the individual sections of the power supply unit of FIG. 4.

FIG. 4 is an illustrative view showing an example of a structure of the power supply unit according to the third embodiment of the present invention. FIG. 5 is a timing chart of signals in the individual sections of the power supply unit of FIG. 4.

In the present third embodiment, the power supply unit 1 has a structure obtained by newly adding an error amplifier 20, a comparator 21, and a triangle wave generator 22 to the structure of the foregoing second embodiment, which includes the overcurrent detection circuit 2, the digital filter 3, the comparator 4, the current detection monitor section 6, the error amplifier 7, the pre-driver 9, the power supply generation section 10, and the inverter 18, and includes a DC-DC converter of an average-current-mode control type, as shown in FIG. 4. To the current detection monitor section 6, a comparator 23 has been newly added.

The power supply generation section 10 includes the smoothing coil 15, the feedback circuit 16, and the smoothing capacitor 17.

To the external terminal Vin of the semiconductor integrated circuit device, each of one coupling portion of the transistor 11, the positive (+) input terminal of the comparator 23, and one coupling portion of the electrostatic capacitor element C is coupled.

To one coupling portion of the switch section SW, the external terminal OUT of the semiconductor integrated circuit device is coupled. To the external terminal OUT, each of the coupling portion between the transistors 11 and 12, and one coupling portion of the smoothing coil 15 is coupled.

To the other coupling portion of the switch section SW, one coupling portion of the resistor R is coupled. To the other coupling portion of the resistor R, the negative (−) input terminal of the comparator 23 is coupled. To each of the positive (+) input terminal and negative (−) input terminal of the comparator 23, the electrostatic capacitor element C is coupled in parallel.

To the output portion of the comparator 23, each of the positive (+) input terminal of the comparator 4, and the negative (−) input terminal of the error amplifier 20 is coupled. The comparator 23 amplifies the difference between respective voltages inputted to the positive (+) input terminal and the negative (−) input terminal, and outputs the amplified voltage difference. The negative (−) input terminal of the comparator 4 is coupled to receive the reference voltage Vref generated by the reference voltage generation circuit VC.

The positive (+) input terminal of the comparator 21 is coupled to receive a triangle wave generated by the triangle wave generator 22. The negative (−) input terminal of the comparator 21 is coupled to receive the output signal from the error amplifier 20.

In the present third embodiment, the feedback circuit 16 is provided inside the semiconductor integrated circuit device. As for the other part of the coupling configuration, it is the same as in FIG. 3 showing the second embodiment described above so that the description thereof will be omitted.

FIG. 5 is a timing chart for signals in the individual sections of the power supply unit 1 of FIG. 4. In a downward direction of FIG. 5, there are shown respective signal timings for the current IL flowing in the smoothing coil 15, the signal inp inputted to the negative (−) input terminal of the comparator 23, the sample/hold signal S/Hout outputted from the switch section SW, the signal inn inputted to the positive (+) input terminal of the comparator 23, a signal compout1 outputted from the comparator 23, the triangle wave generated by the triangle wave generator 22, the signal compout outputted from the comparator 21, the current Io outputted from the output portion VOUT, and the voltage Vo outputted from the output portion VOUT.

First, a description will be given of the operation in the time interval t4 of FIG. 5 in which a normal operation is performed.

First, in the time interval t4, the error amplifier 7 makes a comparison between the reference voltage Vref and the feedback voltage outputted from the feedback circuit 16, amplifies the error therebetween, and outputs the amplified error to the error amplifier 20.

The error amplifier 20 amplifies the error between the output signal from the sense amplifier 7 and the output signal compout1 from the comparator 23, and outputs the amplified error to the comparator 21. The comparator 21 makes a comparison between an output signal gmout from the error amplifier 20 and the triangle wave outputted from the triangle wave generator 22, and outputs the output signal compout on the Hi level when the voltage level of the triangle wave is higher than that of the output signal from the error amplifier 20, or outputs the output signal compout on the Lo level when the voltage level of the triangle wave is lower than that of the output signal from the error amplifier 20.

The AND circuit AD performs an AND operation between the output signal compout from the hysteresis comparator 8 and the output signal from the inverter 18, and outputs a signal indicative of the result of the arithmetic operation to the switch section SW.

The switch section SW serving as the sample/hold section is brought into the conductive (ON) state when a Hi-level signal is inputted to the control terminal to output the voltage generated between the both coupling portions (between the source and drain) of the transistor 11 as the sample/hold signal S/Hout.

The sample/hold signal S/Hout outputted from the switch section SW is filtered by the low-pass filter including the electrostatic capacitor element C and the resistor R to receive the offset voltage applied thereto by the offset power supply circuit 5, and inputted as the signal inn to the comparator 4.

The comparator 23 amplifies the difference between the signal inn and the signal inp, and outputs the amplified difference as the output signal gmout to the comparator 4. When the power supply unit 1 is normally operating, the output signal gmout is lower than the reference voltage Vref, e.g., and the output signal from the comparator 4 is on the Lo level.

Thereafter, in the time interval t5 of FIG. 5, when an overcurrent begins to flow in the power supply unit 1 for any reason, the current Io outputted from the output portion VOUT increases, and the voltage generated between the source and drain of the transistor 11 as well as the potential difference between the signal inp and the signal inn also increases with the increase of the current Io.

As a result, the voltage level of the output signal from the comparator 23 also increases and, when the output signal gmout becomes higher than the reference voltage Vref, the output signal from the comparator 4 is inverted to shift to the Hi level. The digital filter 3 outputs a detection signal to the overcurrent detection circuit 2 when there is no change in the output signal from the comparator 4 even after an arbitrary time has elapsed.

Then, in the interval t6 of FIG. 5, the overcurrent detection circuit 2 determines that the overcurrent is flowing in the power supply unit 1 on receiving the detection signal from the digital filter 3, and outputs the control signal to the reference voltage generation circuit VC to forcibly stop the generation of the reference voltage Vref.

As a result, the present third embodiment can also allow high-accuracy detection of the overcurrent, while reducing a loss resulting from the current detection resistor 13.

In addition, it becomes possible to obtain a wide range of PWM modulation with reduced sub-harmonic oscillation and reduced output ripple compared with that obtained with the peak-current-mode control type.

Although the invention achieved by the present inventors has thus been described specifically based on the embodiment thereof, the present invention is not limited thereto. It will be understood that various changes and modifications can be made in the invention without departing from the gist thereof.

The present invention is suited to a power supply unit for supplying a stabilized power supply to an electronic device, such as a DC-DC converter.

What is claimed is:

1. A power supply unit comprising:
    a stabilized power supply section for generating a stabilized power supply; and
    a current detection section for detecting an average load current in the stabilized power supply generated by the stabilized power supply section,
    wherein the current detection section comprises:
    a current detection resistor for performing current detection;
    a control section for outputting a control signal in each cycle of an arbitrary period;
    a sample/hold section for holding a voltage between both terminals of the current detection resistor at arbitrary time intervals based on the control signal from the control section; and
    a filter section for attenuating ripple in a PWM cycle which is included in a signal sampled by the sample/hold section.

2. A power supply unit according to claim 1, wherein the stabilized power supply section has first and second switching elements each for performing voltage conversion, wherein the current detection resistor has one coupling portion coupled to an input power supply voltage, and wherein the first and second switching elements are coupled in series between the other coupling portion of the current detection resistor and a reference potential.

3. A power supply unit according to claim 2, wherein the control section generates the control signal so as to cause the sample/hold section to sample the voltage between both terminals of the current detection section during a time interval in which the first switching element is ON.

4. A power supply unit according to claim 1, wherein the stabilized power supply section is a DC-DC converter.

* * * * *